March 10, 1936.          C. W. LAWSON              2,033,839
               PRESSURE EQUALIZING VALVE
                  Filed Sept. 20, 1934
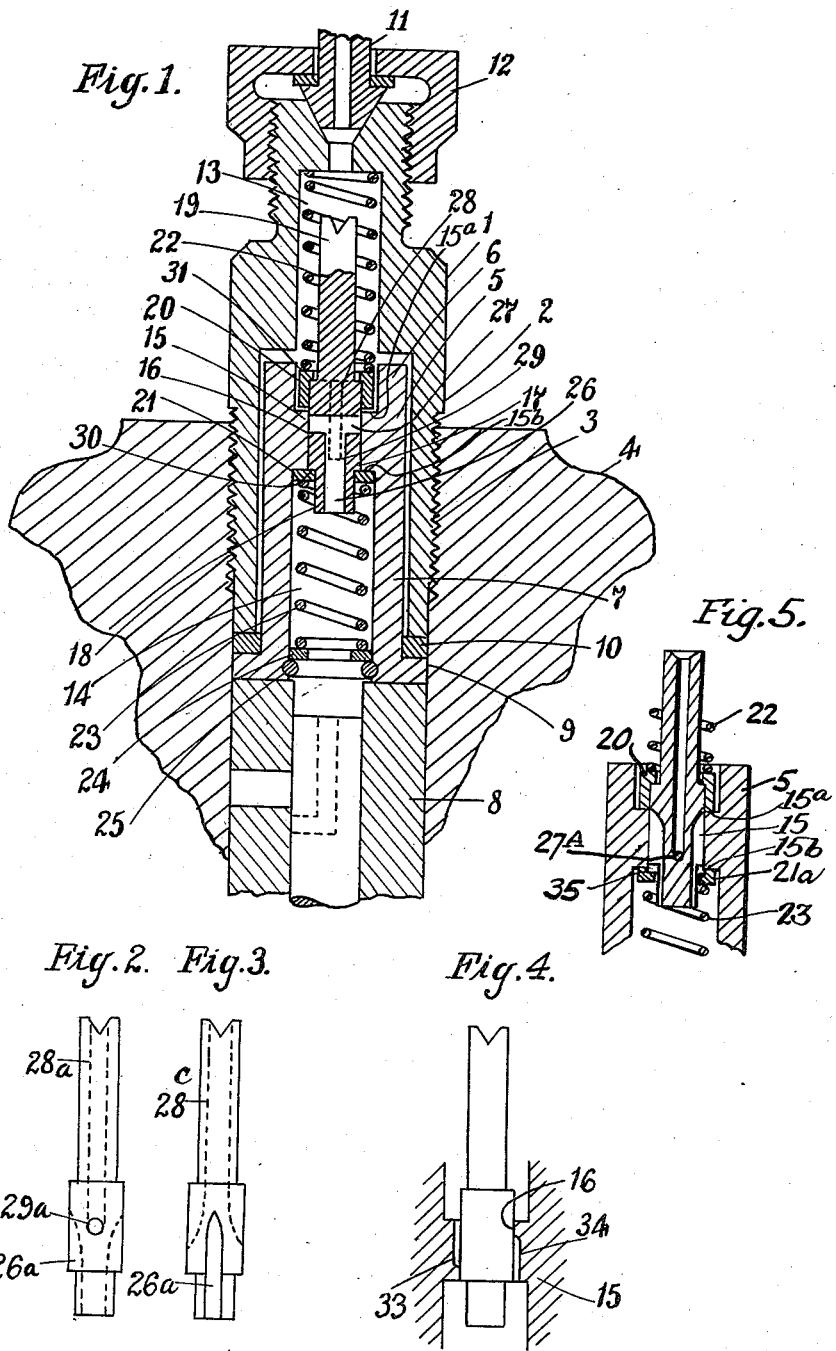
INVENTOR
CYRIL W. LAWSON
By Norris & Bateman
ATTORNEYS Patented Mar. 10, 1936

2,033,839

UNITED STATES PATENT OFFICE 2,033,839

PRESSURE EQUALIZING VALVE

Cyril William Lawson, London, England, assignor to Bryce Limited, Hackbridge, England, a company of Great Britain Application September 20, 1934, Serial No. 744,853
In Great Britain April 20, 1934

8 Claims. (Cl. 251—118)

This invention relates to valves for fuel injection systems of internal combustion engines. More particularly it relates to valves operated by the pressure of the fuel in a liquid fuel injection system such as in a Diesel engine. In such systems a common arrangement is for the pressure to be controlled by reciprocating pumps, there being usually a reciprocating pump for each cylinder driven synchronously with the engine and connected by a supply line with the associated cylinder.

In order to avoid fuel injection occurring due to minor fluctuations in pressure caused by the pump it is desirable to employ a valve in the supply line which shall not open until a predetermined pressure has been built up by the pump.

An important object of the invention is to devise a valve which shall satisfy this requirement and at the same time relieve instantaneously any pressure set up in the supply line between the valve and the cylinder.

Another object of the invention is to provide a valve which shall have a reduced wear compared to that of a poppet valve. A further object is to provide a pressure equalizing valve comprising a plunger displaceable in either direction under the fuel pressure, said plunger being biased in opposite directions to assume an intermediate position and adapted to establish communication past the valve when displaced from the said intermediate position through a predetermined distance forwardly in the direction of flow of fluid during injection or when displaced backwardly after the fuel injection.

Preferably when relieving excess pressure other than minor fluctuations communication is established past the plunger.

Conveniently, chambers separated by a partition are formed in the valve casing and a bore is formed in the partition within which the plunger slides the surface of the bore constituting a guide for the plunger and forming a liquid tight fit therewith.

Suitable intercommunicating fuel passages which may be grooves or ducts are formed in the plunger or in the partition or in both the plunger and the partition.

In order that the invention may be more clearly understood reference will now be made to the accompanying drawing which illustrates one embodiment of the invention and wherein, Fig. 1 is a vertical sectional view showing a valve embodying the invention.

Figs. 2, 3 and 4 respectively show modified forms of a plunger, whilst

Fig. 5 shows a modification in the method of biasing the plunger.

In the drawing, 1 denotes the body portion of the valve formed with a wall 2 located by means of a screw thread 3 in the casing 4 of the engine. As shown the valve is formed with a supplementary body portion 5 having walls 6 and 7 which is held in position by means of a flange 9 at its lower end being clamped between the fuel injection pump 8 and the end of the wall 2 with the interposition of a packing ring 10.

During injection fuel passes upwardly through the valve from the pump 8 and thence passes through a pipe 11 secured to the valve by a union nut 12 and leading to the respective injection nozzle. Within the body portion are formed chambers 13 and 14 separated by a partition 15. A bore is formed through the partition which bore is bordered by a surface 16 which acts as a guide for a plunger 17. The plunger is formed with an extension 18 at the lower end and at the upper end with an extension 19 which abuts against the end of the chamber 13 when the plunger is forced upwardly thereby limiting its displacement, the end of the extension 19 being notched to allow for fuel passage when in the extreme position.

Collars 20 and 21 respectively surround the extensions 19 and 18, these collars being of greater overall diameter than the bore through the partition so that they cannot pass through. The internal diameter of the collars is also such that they cannot pass over the body portion of the plunger. As shown the collar 20 is formed with a depending flange overhanging a portion of the body part of the plunger. A spring 22 is located between the collar 20 and the upper end of the chamber 13 and another spring 23 bears between the collar 21 and a washer 24 held in position by means of a spring ring 25. The distances through which the springs 22 and 23 can expand and be effective are limited by the collars 20 and 21 abutting against the sides 15a and 15b respectively of the partition 15 which sides act as stops for the springs. The plunger 17 is formed with an axial duct 26 extending from its lower face and connecting with a lateral duct 27 the ends of which are located in the side of the plunger 17 and are normally covered by the surface 16, which surface also acts as a guide for the plunger 17.

One or more grooves 28 of which one is shown dotted extend from the upper end of the body portion of the plunger 17 for a portion of the length.

The operation of the valve is as follows: The springs 22 and 23 tend to bias the plunger 17 into an intermediate position which is that shown in Fig. 1, and in which position no fuel can pass the valve in either direction. When the injection pressure is built up by the pump 8 the pressure acting on the lower face of the plunger 17 will force the plunger upwardly compressing the spring 22, the shoulder 30 moving away from the collar 21, the collar 21 however remaining against the lower face of the partition 15. As soon as the duct 27 moves clear of the surface 16, communication will be established for the fuel between chamber 13 and chamber 14 through ducts 26 and 27 acting as a bypass passage and fuel will be forced through the pipe 11 to the injection nozzle in the cylinder. As soon as the pump pressure falls the plunger will return to its original determined position. If however there is any residual pressure in the pipe 11 such as might cause dribbling at the injection nozzle or any pressure is subsequently built up, this pressure will force the plunger 17 downwards compressing the spring 23 and causing the shoulder 31 to move away from abutting relationship with the collar 20, the collar 20 remaining pressed against the upper face of the partition 17. If the pressure in the chamber 13 is sufficient to move the plunger downwardly until the lower end 29 of the groove 28 is clear of the surface 16, communication will be established past the valve, the groove 28 acting as a relieving bypass passage. It will be appreciated that the plunger moves due to a difference in pressure between chambers 13 and 14; and that the employment of the collars ensures that the closing movement is not opposed by the spring acting on the other side of the plunger.

Fig. 2 shows a plunger similar to that shown in Fig. 1 in which the positions of the grooves and ducts are reversed, the plunger being formed with an axial duct 28ª extending from the upper end to a lateral duct 29ª for relieving excess pressure in the pipe leading to the nozzle, whilst a groove or grooves 26ª are formed extending upwardly from the lower end of the plunger to provide communication during fuel injection. Fig. 3 shows an arrangement in which the plunger is formed with grooves for communication in each direction, the grooves leading from the upper end being designated by the reference 28ᶜ and those leading from the lower end being designated by the reference 26ª.

Fig. 4 shows an arrangement of a similar nature to that indicated in Fig. 3 excepting that grooves 33 and 34 are formed in the surface 16 of the partition 15 instead of in the actual plunger itself as in the case of the grooves 28ᶜ and 26ª shown in Fig. 3.

In place of the grooves, ducts may be formed in the partition 15 extending from each of the chambers 13 and 14 respectively and terminating in the surface 16.

Figure 5 shows an arrangement wherein a clearance recess 35 is formed in the collar 21ª so that when the collars 20 and 21ª abut against the sides 15ª and 15ᵇ of the partition 15, the plunger is permitted a limited amount of movement before either of the springs 22 or 23 is compressed. This movement may if desired be beyond the limits of the liquid tight position of the valve in either or both directions. In this manner a coarse biasing is effected by means of the springs and a fine biasing by means of the fluid pressures acting on opposite faces of the plunger.

The duct 27 in Fig. 1 is preferably positioned so that it is normally located near to the upper edge of the surface 16 whilst the end 29 of the groove 28 is preferably arranged to be normally spaced above the lower edge of the surface 16 so that when relieving pressure the plunger must move a certain distance before actual communication is established. In this way pressure waves set up in the pipe 11 are damped out.

I claim:—

1. In a liquid fuel valve of the kind referred to, the combination of a slidable plunger closing a passage through the valve and adapted to be displaced by fuel pressure acting on either end, guide means for said plunger defining said passage and forming a fluid tight joint with said plunger, springs acting on said plunger in opposite directions, stops being provided for limiting the operation of one or the other of said springs when the plunger is displaced in one or the other direction from an intermediate position, and bypassing passages, said guide forming means for closing said bypassing passages excepting when said plunger is displaced by predetermined amounts from said intermediate position respectively in either direction.

2. In a liquid fuel valve of the kind referred to, a body portion forming valve chambers, a plunger, a partition between said chambers, a surface bordering a bore through said partition and constituting a guide for said plunger and forming a fluid tight joint therewith, extensions on said plunger of reduced section at each end thereof, collars loosely surrounding said extensions, said collars being larger in diameter than the section of said bore, springs oppositely biasing said plunger interposed between said collars and said casing, a first bypass passage, said guide forming means for normally closing said passage by the coaction of said plunger and said guide excepting when said plunger is displaced a predetermined distance in the one direction from an intermediate position in the bore, and a second bypass passage, said guide forming means whereby said second passage is normally closed by said valve member, excepting when said valve member is displaced from said intermediate position a predetermined distance in the opposite direction.

3. A liquid fuel valve of the kind referred to comprising a body portion forming valve chambers, a slidable plunger, a partition between said chambers, a guide surface for said plunger bordering a bore through said partition and forming a liquid tight joint with said plunger, springs oppositely biasing said valve member into an intermediate position, said body portion having stops limiting the operation of one or the other of said springs when the plunger is displaced in one or the other direction from said intermediate position, an axial duct in said plunger leading from one end thereof to a lateral duct which terminates in a portion of the plunger normally closed by said guide surface and a groove extending from the other end of said plunger to a point spaced from said first-mentioned end and normally covered by said guide surface.

4. A valve for a liquid fuel injection system of the kind referred to comprising a body portion forming valve chambers, a partition between said chambers, a longitudinal surface bordering a bore through said partition, a plunger longitudinally slidable through said bore and coacting with said surface to form a fluid tight joint and passages in said partition extending from each side thereof and respectively terminating at suitable points along said surface, and springs oppositely biasing said plunger into an intermediate position, said body portion having means limiting the operation of one or the other of said springs when the plunger is displaced in one or the other direction from said intermediate position.

5. A liquid fuel valve of the kind referred to comprising a body portion forming valve chambers, a partition between said chambers, a valve member longitudinally slidable in a bore in said partition, springs biasing said valve member into an intermediate position, said body portion forming means limiting the operation of one or the other of said springs when the valve member is displaced in one or the other direction from said intermediate position, an axial duct in said valve member leading from one end thereof to a lateral duct normally closed by said partition and a groove extending from the other end of said valve member to a point suitably spaced from said first-mentioned end.

6. A valve for a liquid fuel injection system of the kind referred to comprising a valve body having a valve member therein adapted to be subjected to differential fluid pressure, a bypass passage normally covered by said valve member but uncovered when said member is displaced under fuel supply pressure, an end portion of said valve member being of reduced diameter and adapted to abut against a portion of said valve body and limit the displacement of said valve member, a relieving bypass passage and springs acting on said valve member in opposite directions, said valve body forming stops limiting the operation of one or the other of said springs when said valve member is displaced in one or the other direction from an intermediate position whereby said relieving bypass passage is normally covered by said valve member but uncovered by backward movement of said member due to excess fuel pressure on the forward side of said valve.

7. In a liquid fuel injection valve of the kind referred to, the combination of a slidable plunger closing a passage through the valve and adapted to be displaced by fuel pressure acting on either end, guide means for said plunger defining said passage and forming a fluid tight joint with said plunger, springs acting on said plunger in opposite directions, said guide forming stops limiting the operation of one or the other of said springs when the plunger is displaced in one or the other direction beyond a limited range of intermediate positions, and bypassing passages, said guide forming means for closing said bypassing passages excepting when said plunger is displaced at least beyond said range of intermediate positions respectively in either direction.

8. In a fuel injection valve of the kind referred to, a body portion forming valve chambers, a plunger, a partition between said chambers, a surface bordering a bore through said partition of less length than said plunger and constituting a guide for said plunger and forming a fluid tight joint therewith, extensions on said plunger of reduced section at each end thereof, collars loosely surrounding said extensions, said collars being larger in diameter than the section of said guide bore, springs oppositely biasing said plunger interposed between said collars and said body portion and bypassing passages closed excepting when said plunger is displaced respectively in either direction from an intermediate position.

CYRIL WILLIAM LAWSON.